United States Patent [19]

Mollura

[11] 4,088,362
[45] May 9, 1978

[54] INFLATABLE AERODYNAMIC NOSE CONE

[76] Inventor: Carlos A. Mollura, 2824 Del Oro Pl., Fullerton, Calif. 91733

[21] Appl. No.: 723,756

[22] Filed: Sep. 16, 1976

[51] Int. Cl.² .............................................. B62D 35/00
[52] U.S. Cl. ........................................ 296/1 S; 52/2; 105/2 R
[58] Field of Search ................... 296/1 S, 91, 23 MC; 105/2 R; 52/2

[56] References Cited

U.S. PATENT DOCUMENTS

| | | | |
|---|---|---|---|
| 2,514,695 | 7/1950 | Dempsey | 296/1 S |
| 3,390,491 | 7/1968 | Hayden | 52/2 |
| 3,549,194 | 12/1970 | Matson | 296/23 MC |
| 3,762,108 | 10/1973 | Pierson | 52/2 |
| 3,814,472 | 6/1974 | Zelikovitz | 296/1 S |
| 3,912,323 | 10/1975 | Dancik | 296/91 |
| 3,918,518 | 11/1975 | James | 52/2 |
| 3,945,677 | 3/1976 | Servais | 296/1 S |

Primary Examiner—Joseph F. Peters, Jr.
Assistant Examiner—John A. Carroll
Attorney, Agent, or Firm—Flam & Flam

[57] ABSTRACT

A nose cone for attachment to cargo trailers provides stability and fuel economy. In addition to these properties, the nose cone is inflatable and readily detachable so that it can be used in fleet operation without down time.

2 Claims, 4 Drawing Figures

U.S. Patent   May 9, 1978   4,088,362
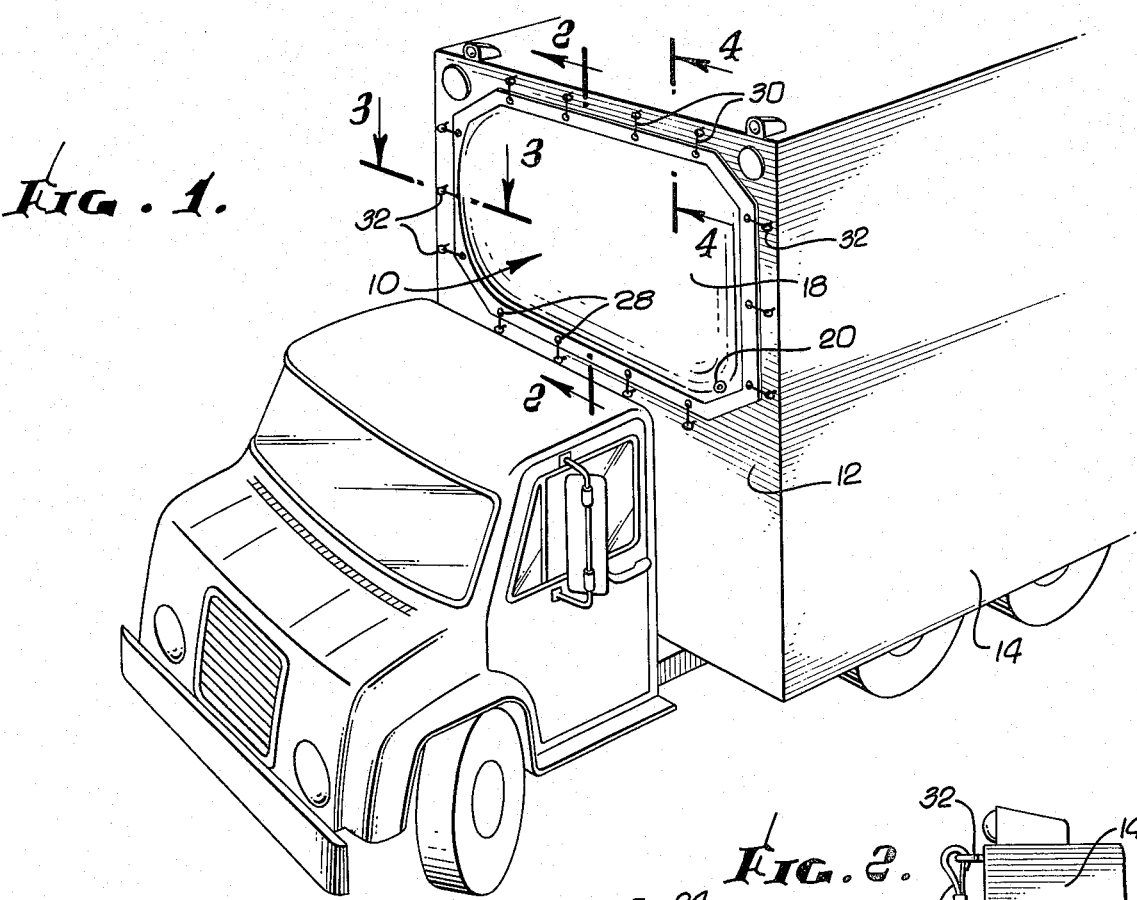
Fig. 1.
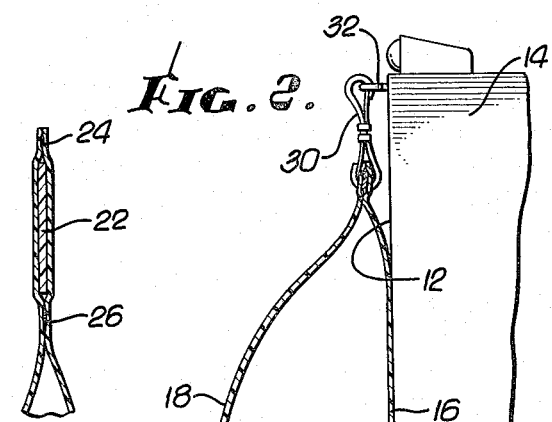
Fig. 2.
Fig. 4.
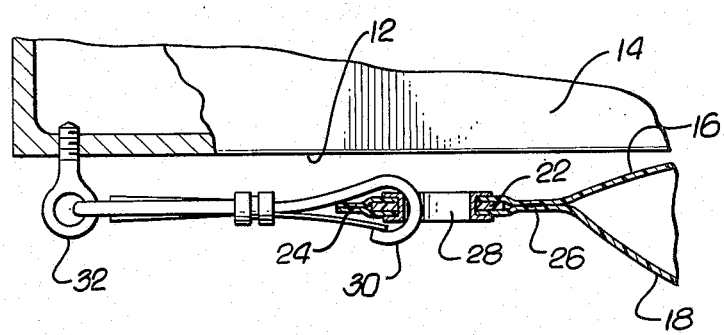
Fig. 3.

INFLATABLE AERODYNAMIC NOSE CONE

FIELD OF INVENTION

This invention relates to nose cones for attachment to the frontal surfaces of cargo trailers.

BACKGROUND OF INVENTION

In the past, aerodynamic nose cones have been used successfully to increase fuel economy and to provide improved stability. Usually these nose cones have been made of molded fiberglass and permanently affixed to the face or frontal surface of the truck or cargo trailer. Ordinarily these nose cones require caulking about the edges to exclude the elements and splashing water to protect it from rapid deterioration. The nose cone must be exceptionally sturdy to withstand the bombardment of rocks and even pellets that become potentially destructive missiles.

Notwithstanding good engineering techniques, nose cones still fracture. Cosmetic repair is relatively simple; but structural repairs are costly and not necessarily free of proclivities for further fractures.

Prior nose cones require essentially permanent attachment to a trailer face. But trailers may be off the road a considerable time during loading, unloading and for other purposes. Accordingly, the heavy investment in a nose cone could be justified if it could readily be demounted and installed on a road ready trailer.

The primary object of this invention is to provide a new and readily demountable nose cone that provides effective armor for combat with road rocks, etc.

SUMMARY OF INVENTION

In order to accomplish the foregoing objects, I provide a nose cone made of tough yieldable material that distributes the impact energy of road rocks, etc. with consequent low incidence of fracture. The nose cone is an inflatable bag made of tough polyurethane plastic that is readily repairable by a heat patch. By deflating the bag, it is readily removable from the front panel of the truck and installed on a road ready vehicle. The bag is made by established heat seal methods without the requirement of any expensive forms for fiberglass or the like.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a pictorial view of a truck and trailer, a nose cone incorporating the present invention being installed on the face of the trailer.

FIG. 2 is an enlarged vertical sectional view of the inflated nose cone, and taken along a plane corresponding to line 2—2 of FIG. 1.

FIG. 3 is a fragmentary sectional view on a further enlarged scale taken along a plane corresponding to line 3—3 of FIG. 1 and illustrating the detachable fasteners for the nose cone.

FIG. 4 is an enlarged sectional view taken along a plane corresponding to line 4—4 of FIG. 1 and illustrating the edge structure of the nose cone.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

The nose cone 10 shown in FIG. 1 is detachably secured to the front face 12 of a typical cargo trailer 14. The nose cone comprises two plies of air tight, tough polyurethane sheet plastic 16 and 18 with their edges sealed and firmly secured to each other. The two plies thus form a bag that can be inflated to assume a bulbous configuration. For this purpose, a typical tire valve 20 (FIG. 1) is provided at one lower corner of the bag. The plies can have any desired square, rectangular, oval or other form. Generally the plies should correspond to the face 12.

The inflated bag with its edges held against the trailer face 12, assumes a domed configuration that provides good aerodynamic properties. Thus the outer ply 18, under pneumatic pressure from the inside, flexes outwardly under the confinement of its edges while the inner ply 16 remains flat against the trailer face 12. The air passing over the truck cab is relatively smoothly deflected to the sides, top and bottom, all in a well understood manner. Resistance to forward movement is thus decreased with consequent power and fuel savings. Lateral stability is provided also.

In order to attach the edges of the plies 16 and 18 together in a manner to resist high tear forces, reinforcing webbing 22 (FIG. 4) is interposed between the plies. The plies are welded together along the inside and outside edges of the webbing 22 along lines 24 and 26. The edges define a peripheral attachment rim of the bag. Preferably the weld is made by application of heat, as by the aid of dielectric plates. Grommets 28 are spaced along the edges and extend through the webbing as well as the edges of the plies on opposite sides. The grommets stabilize the webbing in the plies and complete a sturdy edge structure.

The grommets 28 also serve as a means for detachable connection of the nose cone to the truck 14. For this purpose a series of quick release fasteners 30 are provided, one for each grommet. The fasteners 30 in the present instance are in the form of double snatches or snaps of a type commercially available. These snaps have hooks at opposite ends, the openings to which are releasably closed by leaf springs. The hook at one end engages the grommet while the hook at the opposite end engages an eye bolt 32 threadedly or otherwise fastened to the truck face.

The eye bolts 32 form the only permanent installation on the trailer 14. Not only are these components inexpensive, but they are easily installed. Caulking of edges, welding, complicated brackets for attachment, etc. are not required. The bag inherently is weather ready.

The polyurethane ply 18 when in combat with pebbles and rocks readily yields to absorb the impact energy as a spring. Only rocks or pebbles that are sharp tend to destroy the ply. Even sharp pebbles and rocks lose their cutting ability because the exposed ply is not firmly backed. Months of road experience with an experimental model prove the nose cone to be exceptionally durable. On rare occasions, a patch is required. But that is easily provided by heat seal methods. The plies 16 and 18 being identical, can be reversed for equalizing abrasion occuring over long periods of time.

The detachable fasteners 30 are attached and the nose cone 10 is positioned on the trailer before the nose cone is inflated. When the nose cone is inflated, the bag tends to assume a spherical configuration. The edges tend to move inwardly. As a result of inflation, a stress is imposed on the fasteners 30 and the edges of the bag. The interaction of the inflated bag and the peripheral attachment result in a solid edge structure that is incredibly stable. Consequently, the high forces imposed on the bag when the trailer is moving at high speed are effectively accommodated by the very simple mounting.

The bag is unlocked from the trailer by the simple expedient of releasing the air by suitable operation of the valve 20. Only when the bag is deflated can the fasteners 30 be manipulated for detachment of the bag. By detaching the bag, it can be used in a road ready trailer. One man can easily handle the deflated bag.

Intending to claim all novel, useful and unobvious features shown or described, I make the following claims:

1. A nose cone for a vehicle having a frontal surface exposed to aerodynamic forces:
   a. a pair of juxtaposed plies of plastic material of similar contour sealed together along their peripheral edges to form an inflatable bag;
   b. reinforcing webbing interposed between the plies for strengthening the edges;
   c. valve means for admission and capture of inflation air to said bag to cause said bag to assume a rounded configuration;
   d. a first series of discrete fastener elements extending in spaced relationship along the said peripheral edges;
   e. a second series of discrete companion fastener elements attached to said frontal surface in an array to register with said first series of fastener elements; and
   f. said fastener elements of said first and second series being detachable when said bag is deflated, inflation of said bag causing said edges to contrict and thereby to impose a centripetal stress upon said second series of fastener elements thereby to lock said bag in place.

2. The nose cone as set forth in claim 1 in which said first series of fastener elements comprise hollow grommets extending through said webbing, said second fastener elements including hooks cooperable with the grommets.

* * * * *